(12) United States Patent
Miura et al.

(10) Patent No.: US 8,974,863 B2
(45) Date of Patent: Mar. 10, 2015

(54) METHOD FOR PRODUCING FIBER-REINFORCED COMPOSITE MATERIAL, AND HEAT-RESISTANT MOLD MATERIAL AND HEAT-RESISTANT STRUCTURAL MATERIAL USING THE FIBER-REINFORCED COMPOSITE MATERIAL

(75) Inventors: Teppei Miura, Toyohashi (JP); Manabu Kaneko, Toyohashi (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 13/499,800

(22) PCT Filed: Oct. 1, 2010

(86) PCT No.: PCT/JP2010/067267
§ 371 (c)(1),
(2), (4) Date: Jun. 4, 2012

(87) PCT Pub. No.: WO2011/040602
PCT Pub. Date: Apr. 7, 2011

(65) Prior Publication Data
US 2012/0231687 A1    Sep. 13, 2012

(30) Foreign Application Priority Data
Oct. 2, 2009   (JP) ................................. 2009-230524

(51) Int. Cl.
*B05D 3/02* (2006.01)
*C08J 5/24* (2006.01)
(Continued)

(52) U.S. Cl.
CPC ............... *C08J 5/24* (2013.01); *C08G 59/3218* (2013.01); *C08G 59/3227* (2013.01); *C08G 59/504* (2013.01); *C08L 63/00* (2013.01); *C08J 2363/00* (2013.01)
USPC .......................................................... 427/379

(58) Field of Classification Search
USPC .......................................................... 427/379
See application file for complete search history.

(56) References Cited

U.S. PATENT DOCUMENTS

2006/0035548 A1*   2/2006   Goto et al. ...................... 442/65
2010/0040874 A1    2/2010   Narahashi et al.

FOREIGN PATENT DOCUMENTS

| EP | 1 275 674 A1 | 1/2003 |
| JP | 8 41173 | 2/1996 |

(Continued)

OTHER PUBLICATIONS

International Search Report Issued Dec. 21, 2010 in PCT/JP10/67267 Filed Oct. 1, 2010.

(Continued)

*Primary Examiner* — Nathan Empie
(74) *Attorney, Agent, or Firm* — Oblon, McClelland, Maier & Neustadt, L.L.P.

(57) ABSTRACT

A method for producing a fiber-reinforced composite material having high mechanical properties and high heat resistance, and allowing the use of a gypsum die in primary curing, wherein a fiber-reinforced prepreg, obtained by impregnating reinforcing fibers with an epoxy resin composition comprising a triphenylmethane-type epoxy resin, N,N,N',N'-tetraglycidyldiaminodiphenylmethane (B) and diaminodiphenylsulfone (C), is subjected to primary curing at 110-130° C., and then to secondary curing at a temperature which is at least as high as the primary curing temperature.

19 Claims, 2 Drawing Sheets

(51) Int. Cl.
*C08G 59/32* (2006.01)
*C08G 59/50* (2006.01)
*C08L 63/00* (2006.01)

(56) References Cited

FOREIGN PATENT DOCUMENTS

| JP | 9 164351 | 6/1997 |
| JP | 2003 96163 | 4/2003 |
| JP | 2009 68000 | 4/2009 |
| JP | 2009068000 A * | 4/2009 |
| WO | WO 01/81445 A1 | 11/2001 |
| WO | 2008 105480 | 9/2008 |

OTHER PUBLICATIONS

Japanese Office Action issued May 14, 2013, in Japan Patent Application No. 2010-542474.

Extended European Search Report issued Mar. 18, 2013 in European Patent Application No. 10820716.8.

Office Action as received in the corresponding Chinese Patent Application No. 20108044536.3 dated Aug. 6, 2014 w/English Translation.

* cited by examiner

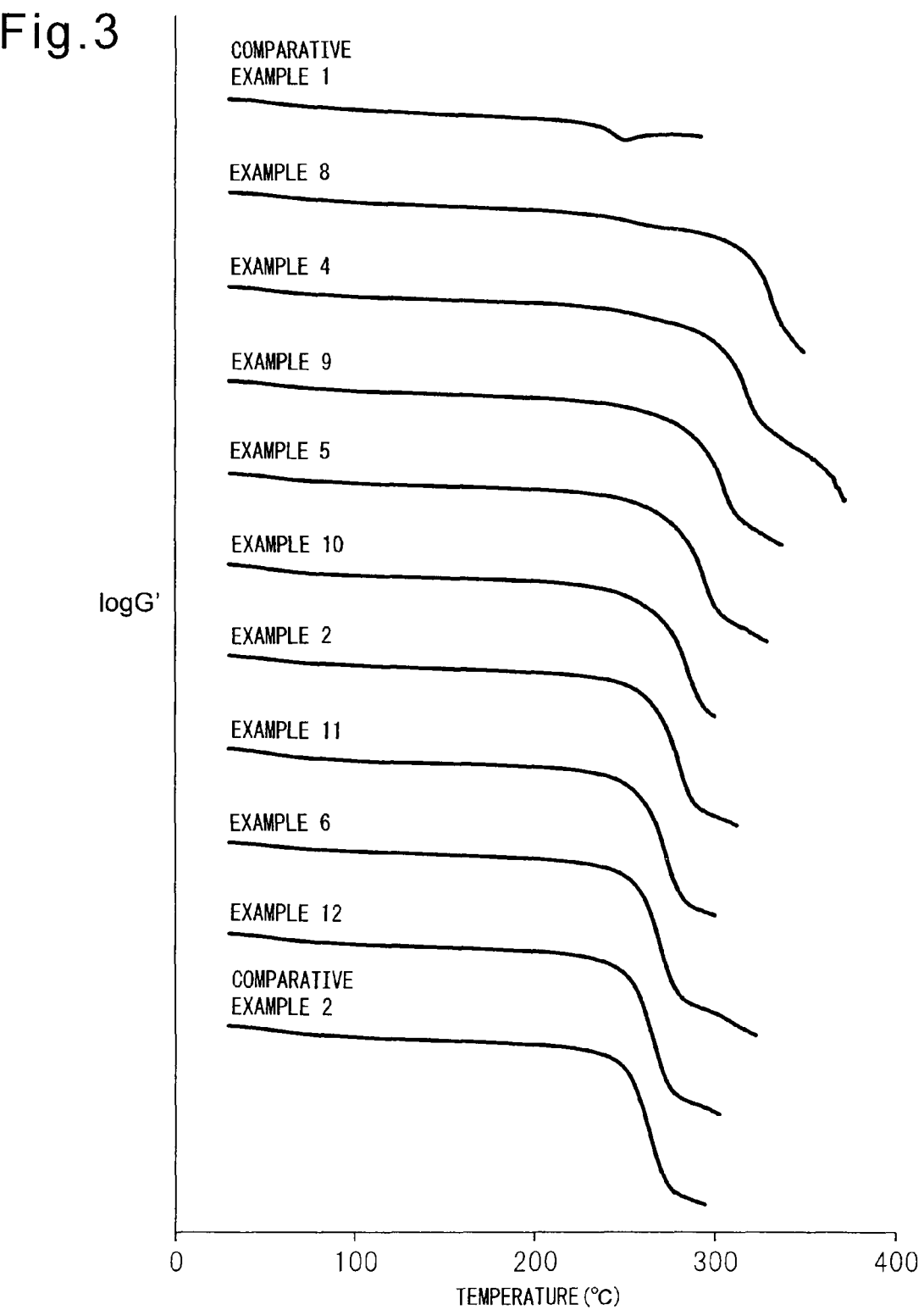

METHOD FOR PRODUCING FIBER-REINFORCED COMPOSITE MATERIAL, AND HEAT-RESISTANT MOLD MATERIAL AND HEAT-RESISTANT STRUCTURAL MATERIAL USING THE FIBER-REINFORCED COMPOSITE MATERIAL

This application is a National Stage of PCT/JP10/067267 filed Oct. 1, 2010 and claims the benefit of JP 2009-230524 filed Oct. 2, 2009.

TECHNICAL FIELD

The present invention relates to a method for producing a fiber-reinforced composite material. In particular, the invention relates to a method for producing a fiber-reinforced composite material that is suitable for use as a heat-resistant mold material or a heat-resistant structural material, as well as heat-resistant mold materials and heat-resistant structural materials obtained by the method.

BACKGROUND ART

One molding method for fiber-reinforced composite materials is a method using a prepreg obtained by impregnating a matrix resin, composed mainly of a thermosetting resin, into reinforcing fibers, and it is employed in a wide range of uses from sports leisure applications to aircraft applications. Molding of a fiber-reinforced composite material using an intermediate base material comprising the aforementioned prepreg is carried out by laminating the prepreg, and then subjecting it to heating or to heating and pressing to cure the thermosetting resin as the matrix resin.

Prepregs can be classified into low temperature-curing (80-100° C.), moderate temperature-curing (110-150° C.) and high temperature-curing (160-200° C.) types, depending on the curing temperature.

Low temperature-curing prepregs can be cured and molded near 90° C., while having a very wide range of selection of subsidiary materials to be used in molding and allowing use of resin dies for molding, thus permitting lower equipment investment. They are therefore advantageous for molding highly variable parts in small amounts. However, since the curing and molding are carried out near 90° C., it is not possible to obtain fiber-reinforced composite materials with excellent heat resistance.

Moderate temperature-curing prepregs serve primarily for molding of generic products for sports and leisure purposes, and allow curing and molding at temperatures near 130° C., and while they produce fiber-reinforced composite materials with excellent mechanical properties, it is not possible to obtain superior heat resistance.

High temperature-curing prepregs are subjected to curing and molding at temperatures near 180° C., and are used, for example, mainly for molding of fiber-reinforced composite materials to be supplied in fields that require excellent heat resistance, such as aircraft production, providing molded articles with extremely excellent heat resistance.

In order to obtain fiber-reinforced composite materials with high heat resistance, curing is accomplished at high temperature, thereby producing both high mechanical properties and high heat resistance. However, two major problems are associated with high temperature-curing systems.

One problem is resin flow. For fiber-reinforced composite material prepregs, the resin viscosity is usually set in consideration of manageability at room temperature. Because of the large difference between room temperature and the curing temperature in a high temperature-curing system, the viscosity of the impregnated resin tends to be reduced and resin flow readily occurs. This results in sections of resin deficiency or excess in the fiber-reinforced composite material. Variations in the matrix resin distribution not only affect the thickness and outer appearance of the molded article, but are also associated with reduced mechanical properties, and cracking. This is of particular concern for heat-resistant materials, which may suffer adverse effects to their long-term heat resistance.

Another problem is the heat resistance of mold materials and subsidiary materials. A fiber-reinforced composite material is usually molded using a molding die. Examples of molding methods include "hand lay-up" methods in which repetition of a procedure wherein a resin is impregnated into a reinforcing fiber material such as a cloth while applying it along a molding die, or wherein a prepreg having the resin already impregnated in a reinforcing fiber material is applied along a molding die, is followed by curing, and then removal from the die to obtain a molded article; resin transfer molding methods in which a reinforcing fiber material such as a cloth is set in a molding die, and then a resin is injected therein and cured and then removed from the die to obtain a molded article; molding compound methods in which a molding material comprising a mixture of a resin with a reinforcing fiber material cut into staple fibers is injected into a molding die and then cured, and then removed from the die to obtain a molded article; and methods in which rectangular columnar molding dies (mandrels) are used as inserts to hold and cure a prepreg in an I-beam or H-beam shape, and are then removed from the die to obtain a molded article.

The molding dies used in such molding methods are made of various types of materials including metal, resin, wooden and gypsum. Metal molding dies have excellent heat resistance and durability, but are expensive due to the effort and labor required for their formation, while their high specific gravity renders them problematically heavy. Resin molding dies and wooden molding dies, on the other hand, have inferior heat resistance and durability. At the current time, gypsum molding dies are in wide use because of their satisfactory balance between performance and cost.

In molding methods using such gypsum molding dies, the molding is preferably carried out at no higher than 130° C. because of the heat resistance of the molding dies themselves or the subsidiary materials, and this generally hampers molding of highly heat-resistant materials using high temperature-curing prepregs that require molding temperatures of 180° C. or higher. When it is attempted to cure and mold such high temperature-curing prepregs at low temperature or moderate temperature, molding is usually impossible to accomplish, or else an exceedingly long time is necessary and the molded article has vastly reduced heat resistance.

A widely employed solution is to carry out primary curing of the high temperature-curing prepreg at low temperature or moderate temperature, with addition of a curing agent and curing accelerator to the resin composition, and to subsequently carry out secondary curing at high temperature, but it is generally impossible to avoid reduction in mechanical properties and heat resistance, and even when mechanical properties are maintained, the heat resistance has been inevitably reduced due to addition of the curing agent and curing accelerator.

PRIOR ART REFERENCE

Patent Document

Patent document 1: Japanese Unexamined Patent Publication No. 2003-96163

DISCLOSURE OF THE INVENTION

Problems to be Solved by the Invention

In light of the problems of the prior art described above, it is an object of the present invention to provide a method for producing a fiber-reinforced composite material with high mechanical properties and high heat resistance, which allows a gypsum die to be used in primary curing.

Means for Solving the Problems

The present inventors have completed this invention as a result of avid research conducted with the goal of solving the problems described above.

The invention provides the following (1) to (9).

(1) A method for producing a fiber-reinforced composite material, wherein a fiber-reinforced prepreg, obtained by impregnating reinforcing fibers with an epoxy resin composition comprising a triphenylmethane-type epoxy resin represented by the following formula 1 (A), N,N,N',N'-tetraglycidyldiaminodiphenylmethane (B) and diaminodiphenylsulfone (C), is subjected to primary curing at 110-130° C., and then to secondary curing at a temperature which is at least as high as the primary curing temperature.

[Chemical 1]

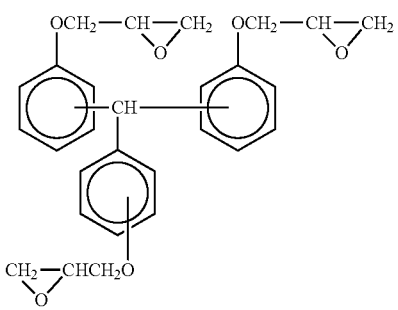

(2) The method for producing a fiber-reinforced composite material according to (1) above, wherein the secondary curing temperature is 180° C. or higher.

(3) The method for producing a fiber-reinforced composite material according to (1) above, wherein the fiber matrix of the fiber-reinforced composite material consists of carbon fibers.

(4) The method for producing a fiber-reinforced composite material according to (1) above, wherein the fiber matrix of the fiber-reinforced composite material is a woven fabric.

(5) The method for producing a fiber-reinforced composite material according to (1) above, wherein the fiber matrix of the fiber-reinforced composite material consists of a chopped material.

(6) The method for producing a fiber-reinforced composite material according to any one of (1) to (5) above, wherein a heat-resistant mold material is obtained as a fiber-reinforced composite material by primary removal from the mother die after primary curing, and secondary curing in a free standing state.

(7) The method for producing a fiber-reinforced composite material according to any one of (1) to (5) above, wherein a heat-resistant structural material is obtained as a fiber-reinforced composite material by primary removal from the mother die after primary curing, and secondary curing in a free standing state.

(8) A heat-resistant mold material obtained by the method according to (6) above.

(9) A heat-resistant structural material obtained by the method according to (7) above.

Effect of the Invention

According to the invention it is possible to provide a composite material exhibiting high mechanical properties and high heat resistance. A composite material obtained by the method of the invention is useful as a heat-resistant mold material or a heat-resistant structural material for which high mechanical properties and high heat resistance are required.

BRIEF DESCRIPTION OF THE DRAWINGS

FIG. 3 is a graph of G' values for cured products. The ordinate represents log G' and the abscissa represents temperature. The ordinate is offset.

MODES FOR CARRYING OUT THE INVENTION

Figure 1:
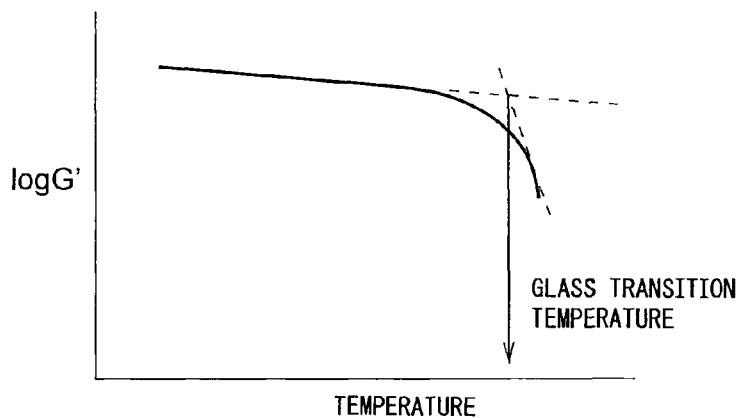
FIG. 1 is a graph used to determine the G'-Tg of a cured product, from the intersection between a tangent on the graph of the cured product in the glassy state, and the tangent in the transition region.

Preferred modes of the invention will now be explained with the understanding that the invention is not limited only to these modes, and that various modifications may be made such as are within the spirit and scope of the invention.

The epoxy resin composition to be used for the invention comprises a triphenylmethane-type epoxy resin represented by formula 1 above (A), N,N,N',N'-tetraglycidyldiaminodiphenylmethane (B) and diaminodiphenylsulfone (C). The mixing ratio of (A) and (B) in the epoxy resin composition is preferably 90:10 to 10:90 in terms of mass ratio, from the viewpoint of achieving both high resin properties and high heat resistance. It is more preferably 60:40 to 20:80. It is yet more preferably 50:50 to 20:80. From the viewpoint of the flexural modulus of the secondary cured product, the ratio is preferably 90:10 to 30:70. From the viewpoint of heat resistance, it is preferably 90:10 to 40:60. It is more preferably 90:10 to 60:40, and even more preferably 90:10 to 80:20. From the viewpoint of the primary curing degree, it is preferably 80:20 to 10:90.

The diaminodiphenylsulfone (C) to be used for the invention may be 4,4'-diaminodiphenylsulfone, 3,3'-diaminodiphenylsulfone, or the like. It is preferably 4,4'-diaminodiphenylsulfone. The content of the diaminodiphenylsulfone (C) is preferably an amount such that the ratio of amine equivalents to epoxy equivalents in the epoxy resin composition is 0.8 to 1.5. If the equivalent ratio is 0.8 to 1.5, the elastic modulus will not excessively increase, and there will be minimal adverse effect on the thermal crack resistance of the fiber-reinforced composite material. The amount is more preferably such that the equivalent ratio is 0.8 to 1.2.

The epoxy resin composition used for the invention preferably contains silica (D). The silica (D) is not particularly restricted so long as it is silica. The form may be amorphous or spherical, and the surface substrate may be hydrophobic or hydrophilic. Spherical hydrophilic silica is preferred. The content may be selected as appropriate. The preferred content is 1 to 20 parts by mass with respect to 100 parts by mass as the total of the triphenylmethane-type epoxy resin represented by formula 1 (A) and the N,N,N',N'-tetraglycidyl-diaminodiphenylmethane (B). If the content is less than 1 part by mass the linear expansion coefficient of the composite material will tend to be higher, and the interlayer peel strength of the composite material will tend to be reduced. If the content is greater than 20 parts by mass the heat resistance of the composite material will tend to be lower and the viscosity of the resin composition will be too high, preventing formation of a prepreg. The content is more preferably 4 to 8 parts by mass.

The epoxy resin composition used for the invention preferably further contains a thermoplastic resin (E). Adding a thermoplastic resin (E) can minimize sticking of the resin composition and adjust the tack of the prepreg to a suitable level, or it can minimize changes in tack with time. Examples of such thermoplastic resins include phenoxy resins, polyvinyl formals and polyethersulfones. Phenoxy resins are preferred. The preferred content is 0.1 to 20 parts by mass with respect to 100 parts by mass as the total of the epoxy resin represented by formula 1 (A) and the N,N,N',N'-tetraglycidyldiaminodiphenylmethane (B). It is more preferably 3-7 parts by mass.

The epoxy resin composition used for the invention preferably further contains another epoxy resin (F). The other epoxy resin (F) is preferably bifunctional or greater, with no particular restrictions on bifunctional or greater epoxy resins, examples including epoxy resins such as bisphenol A-type epoxy resins, bisphenol F-type epoxy resins, bisphenol S-type epoxy resins, novolac-type epoxy resins, cresol-novolac-type epoxy resins, aminoglycidyl-type epoxy resins, aminophenol-type epoxy resins, aminocresol-type epoxy resins, naphthalene-type epoxy resins and cyclopentadiene-type epoxy resins. Preferred are bisphenol A-type epoxy resins and bisphenol F-type epoxy resins, with bisphenol A-type epoxy resins being even more preferred. The preferred content is 0.1 to 20 parts by mass with respect to 100 parts by mass as the total of the epoxy resin represented by formula 1 (A) and the N,N,N',N'-tetraglycidyldiaminodiphenylmethane (B). It is more preferably 5 to 15 parts by mass.

The method for producing the epoxy resin composition to be used for the invention is not particularly restricted, and a known technique such as a method using a mixing roll or kneader may be used for its production.

According to the method of the invention, primary curing of the epoxy resin composition is accomplished at a temperature of 110-130° C. A temperature of 110° C. or higher will allow an industrially suitable curing time. If the temperature is no higher than 130° C., resin flow will not be excessive during the primary curing, and the molded article quality will not be impaired. Specific concerns are variation in the molded article thickness (especially reduced thickness on the outer periphery) and variation in the matrix resin distribution, resulting in reduced quality of the outer appearance of the molded article, and reduction in mechanical properties or increased cracking. This is of particular concern for heat-resistant materials, which may suffer adverse effects to their long-term heat resistance.

In consideration of heat resistance of the molding die material or subsidiary material, and of cost, the primary curing temperature is more preferably 110-120° C. Also the primary curing degree, described hereunder, is preferably 50-80% and more preferably 60-75%. Within these ranges, the molded article will be smoothly removable from the molding die after the primary curing.

According to the invention, the primary curing is followed by secondary curing at a temperature which is at least as high as the primary curing temperature. Secondary curing at a temperature which is at least as high as the primary curing temperature increases the mechanical properties and heat resistance of the matrix resin, and also increases the mechanical properties and heat resistance of the fiber-reinforced composite material.

Assuming that the obtained fiber-reinforced composite material will be used as a heat-resistant mold material or heat-resistant structural material, the secondary curing temperature is preferably 180° C. or higher and more preferably 200° C. or higher. There is no particular upper limit to the secondary curing temperature, but it is preferably no higher than 300° C. considering the working temperatures of readily available heating furnaces.

For the fiber matrix of the fiber-reinforced composite material there may be used various inorganic fibers or organic fibers such as glass fibers, carbon fibers, metal fibers or aramid fibers, but glass fibers and/or carbon fibers are preferred in order to lower the linear expansion coefficient of the composite material. Carbon fibers are more preferred.

The fiber matrix can be used directly in the form of a fiber tow, in the form of a unidirectional material having the fiber tow aligned in one direction, in the form of a woven fabric, or in the form of a nonwoven fabric comprising short-cut reinforcing fibers, but considering use of the fiber-reinforced composite material as a heat-resistant mold material or heat-resistant structural material, the fiber matrix is preferably a woven fabric and especially a woven fabric with high shapeability. For a woven fabric, examples include sheets with fiber bundles aligned in one direction, such as plain weave, twill weave, satin weave or non-crimped fabric, or stitching sheets obtained by forming sheets with varied lamination angles, stitched together without looseness.

When the fiber-reinforced composite material is to be used as a cutting material, the fiber matrix preferably consists of a chopped material, such as chopped strands or chopped fibers.

The invention is a method for producing a fiber-reinforced composite material with high mechanical properties and high heat resistance, and it is preferably used for production of a heat-resistant mold material.

The invention is also a method for producing a fiber-reinforced composite material with high mechanical properties and high heat resistance, which is preferably used for production of a heat-resistant structural material.

In the production method of the invention, the secondary curing may be accomplished in a variety of forms, such as secondary curing on the mother die after primary curing, secondary curing reinforced with a support material after removal from the mother die, or free standing secondary curing after removal from the mother die, but in consideration of heat resistance and cost of the mother die and subsidiary materials, the secondary curing is preferably carried out in a free standing manner after removal from the mother die after primary curing.

A known method may be used to produce a prepreg comprising an intermediate material for the fiber-reinforced composite material. For example, there may be mentioned a method of producing a prepreg by supplying a resin to one or both sides of the fiber matrix and heating and pressing to impregnate the fiber matrix with the resin, a method of producing a prepreg by preparing the resin composition as a film and then laminating it with the fiber matrix, and heating and pressing it for impregnation into the fiber matrix, or a method of producing a prepreg by impregnating a fiber matrix with a solution of the resin composition dissolved in a solvent for impregnation of the resin, and then drying it.

Curing of the fiber-reinforced composite material may be accomplished by a known method. Examples of curing methods include autoclave molding methods, oven molding methods, vacuum bag molding methods and press molding methods, although there is no limitation to these. Autoclave molding methods are preferred.

EXAMPLES

The construction of the invention will now be explained in detail based on examples in contrast to comparative examples.
Preparation of Epoxy Resin Composition
The matrix resin composition to be used for production of the prepreg may be prepared in the following manner. The following abbreviations are used for the components used in the epoxy resin compositions of the examples and comparative examples.
Epoxy Resin (A)
Tx742: Epoxy resin corresponding to formula 1, tris(hydroxyphenyl)methane triglycidyl ether, epoxy equivalents: 160 g/eq, Huntsman Advanced Materials Co.
Epoxy Resin (B)
jER604: N,N,N',N'-Tetraglycidyldiaminodiphenylmethane, epoxy equivalents: 120 g/eq, Japan Epoxy Resins Co., Ltd.
Diaminodiphenylsulfone (C)
DDS: 4,4'-Diaminodiphenylsulfone, SEIKACURE S (ground product) by Wakayama Seika, amine active hydrogen equivalents: 62 g/eq
Silica (D)
A380: Silicon dioxide, AEROSIL380PE by Nippon Aerosil Co., Ltd.
Thermoplastic Resin (E)
YP50S: Phenoxy resin, Pheno-Tohto YP-50S by Tohto Kasei Co., Ltd.
Other Epoxy Resin (F)
jER828: Bisphenol A-type epoxy resin, epoxy equivalents: 189 g/eq, Japan Epoxy Resins Co., Ltd.
HP-4032: Naphthalene-type epoxy resin, epoxy equivalents: 151 g/eq, DIC
Curing Accelerator (G)
DCMU: DCMU99, Hodogaya Chemical Co., Ltd.
Other Curing Agent (F)
DICY: DICY15, Japan Epoxy Resins Co., Ltd.

The components were mixed in the mixing ratios listed in Table 1, Table 2, Table 7 and Table 8, and the mixtures were uniformly dispersed at 60° C. to obtain epoxy resin compositions.

After uniformly dissolving jER828 and YP50S at 160° C. in the mixing ratios listed in Table 3, Table 4 and Table 6, each mixture were cooled to room temperature. Also, Tx742, jER604, A380 and DDS were mixed and uniformly dispersed at 60° C. to obtain epoxy resin compositions.
Measurement of Primary Curing Degree at Different Temperatures
The epoxy resin composition obtained in Example 2 described below was heated at different temperatures for different times, as shown in Table 7, using a DSC Q-1000 by TA Instruments, and then cooled to room temperature to obtain a primary cured resin. The residual heat value (E1) of the primary cured resin and the curing heat value (E0) of the uncured epoxy resin composition were measured using a DSC Q-1000 by TA Instruments, under conditions with a temperature-elevating rate of 10° C./min, at 30-300° C. The primary curing degree was determined by the following formula. The results are shown in Table 7 and FIG. 2.

$$\text{Primary curing degree (\%)}=\{(E0)-(E1)\}/(E0)\times 100$$

Measurement of Bending Properties of Cured Resin
After heating the obtained epoxy resin composition to 60° C. for defoaming, it was cast onto a release-treated glass plate to a thickness of 2 mm and sandwiched with another similarly-treated glass plate, and subjected to primary curing from room temperature at a temperature-elevating rate of 1.7° C./min, and upon completion of the primary curing, the temperature was lowered to room temperature and the product was removed from the glass plate, or secondary curing was carried out on a different glass plate if necessary from room temperature at a temperature-elevating rate of 1.7° C./min, to obtain a 2 mm-thick molded sheet. The obtained molded sheet was cut to dimensions of 60 mm length×8 mm width using a wet diamond cutter, to form a test piece. The obtained test piece was subjected to a 3-point bending test using an Instron5565 universal testing machine by Instron and Bluehill analysis software, under measuring conditions with an indenter of R=3.2 mm, L/D=16, and a cross head speed of 2 mm/min, and the flexural strength, flexural modulus and flexural elongation at break were calculated. The results are shown in Table 1, Table 2, Table 3 and Table 8.
Measurement of Glass Transition Point Temperature (Tg) of Cured Resin
In order to measure the bending properties of the cured resin, the molded sheet formation procedure was repeated to obtain a 2 mm-thick molded sheet. The obtained molded sheet was cut to dimensions of 55 mm length×12.7 mm width using a wet diamond cutter, to form a test piece. A DMA ARES-RDA by TA Instruments was used to measure the Tg under conditions with a temperature-elevating rate of 5° C./min, a frequency of 1 Hz and a strain of 0.05%. The log G' was plotted against temperature, and G'-Tg was recorded as the temperature determined from the intersection between an approximate straight line in the flat region before transition of log G', and an approximate straight line in the region of transition of G' (see FIG. 1). Also, tan δ was plotted against temperature, and the temperature showing maximum value for tan δ was recorded as tan δmax. The results are shown in FIG. 3 and Table 1, Table 2, Table 3 and Table 8.
Measurement of Primary Curing Degree of Primary Cured Molded Sheet
After heating the epoxy resin composition obtained by preparation of the epoxy resin composition described above to 60° C. for defoaming, it was cast onto a release-treated glass plate to a thickness of 2 mm and sandwiched between another similarly-treated glass plate, after which it was subjected to primary curing from room temperature at a temperature-elevating rate of 1.7° C./min (a temperature-elevating rate of 2.0° C./min only for Comparative Example 10), and removed from the glass plate to obtain a 2 mm-thick primary cured molded sheet. The residual heat value (E2) of the primary cured molded sheet and the curing heat value (E0) of the uncured epoxy resin composition were measured using a DSC Q-1000 by TA Instruments, under conditions with a temperature-elevating rate of 10° C./min, at 30-350° C. The primary curing degree was determined by the following formula. The results are shown in Table 1 and Table 8.

$$\text{Primary curing degree (\%)}=\{(E0)-(E2)\}/(E0)\times 100$$

Production of Resin Film of 3K Cloth Prepreg

The epoxy resin composition obtained by preparation of the epoxy resin composition described above was coated onto a release sheet using a film coater at 60° C. to a resin basis weight of 133 g/m², to obtain a resin film.

Production of Resin Film of 12K Cloth Prepreg

The epoxy resin composition obtained by preparation of the epoxy resin composition described above was coated onto a release sheet using a film coater at 60° C. to a resin basis weight of 194.4 to 216 g/m², to obtain a resin film.

Production of 3K Cloth Prepreg

Using a TR3110M carbon fiber woven fabric by Mitsubishi Rayon Co., Ltd. as the fiber matrix (using TR30S3L, plain weave, basis weight: 200 g/m²), the resin film for a 3K cloth prepreg obtained as described above was attached to one side thereof, and heated, pressed and impregnated therein to obtain a prepreg with a resin content (RC) of 40%.

Production of 12K Cloth Prepreg

Using a TRK510M carbon fiber woven fabric by Mitsubishi Rayon Co., Ltd. as the fiber matrix (using TR50S12L, 2/2 twill weave, basis weight: 648 g/m²), the resin film for a 12K cloth prepreg obtained as described above was attached to both sides thereof, and heated, pressed and impregnated therein to obtain a prepreg with a resin content (RC) of 37.5%-40%.

Production of Composite Panel

The obtained 12K cloth prepreg was cut into a pattern with dimensions of 300 mm length (warp yarn direction of carbon fiber woven fabric)×300 mm width (weft yarn direction of carbon fiber woven fabric), or 200 mm length×200 mm width. Four similarly patterned prepregs were laminated in alignment in the 0° direction (the warp yarn direction of the carbon fiber woven fabric) and bagged, and then an autoclave was used for primary curing under the curing conditions shown in Table 4 (pressure: 0.5 MPa, vacuum pressure: 0.1 MPa, temperature-elevating rate: 1.7° C./min), and where necessary, an oven was used for secondary curing under the curing conditions shown in Table 4 (temperature-elevating rate: 1.7° C./min), to obtain a composite panel.

Measurement of Bending Properties of Composite

The obtained composite panel was cut to dimensions of 127 mm length×12.7 mm width using a wet diamond cutter, to form a test piece. The obtained test piece was subjected to a 3-point bending test using an Instron5565 universal testing machine by Instron and Bluehill analysis software, according to ASTM D-790 (indenter R=5.0, L/D=40, cross head speed: 6.8-7.3 mm/min), and the flexural strength and flexural modulus were calculated. The results are shown in Table 4.

Measurement of Glass Transition Point Temperature (Tg) of Composite

The obtained composite panel was cut to dimensions of 55 mm length×12.7 mm width using a wet diamond cutter, to form a test piece. A DMA ARES-RDA by TA Instruments was used to measure the Tg under conditions with a temperature-elevating rate of 5° C./min, a frequency of 1 Hz and a strain of 0.05%. The log G' was plotted against temperature, and G'-Tg was recorded as the temperature determined from the intersection between an approximate straight line in the flat region before transition of log G', and an approximate straight line in the region of transition of G' (see FIG. 1). Also, tan δ was plotted against temperature, and the temperature showing maximum value for tan δ was recorded as tan δmax. The results are shown in Table 4.

Molding Using Stainless Steel Mother Die

Three 3K cloth prepregs were laminated with alignment of their directions in the order 0°/45°/0°, where the warp yarn direction of the carbon fiber woven fabric was defined as 0°, and an additional eight 12K cloth prepregs were laminated with alignment of their directions in the order 0°/45°/90°/−45°/−45°/90°/45°/0°, where the warp yarn direction of the carbon fiber woven fabric was defined as 0°, in a SUS die with a convex cross-section, and were bagged, after which an autoclave was used for primary curing under the curing conditions shown in Table 5 (pressure: 0.5 MPa, vacuum pressure: 0.1 MPa, temperature-elevating rate: 1.7° C./min), and after removal, an oven was used for secondary curing in a free standing state under the curing conditions shown in Table 5 (temperature-elevating rate: 1.7° C./min), to obtain a concave composite.

Production of Composite Panel for Thickness Measurement

The obtained 12K cloth prepreg was cut into a pattern with dimensions of 800 mm length (warp yarn direction of carbon fiber woven fabric)×1000 mm width (weft yarn direction of carbon fiber woven fabric), or 1000 mm length×800 mm width. Six of these were laminated with their directions in the order 0°/90°/0°/0°/90°/0°, where the warp yarn direction of the carbon fiber woven fabric was defined as 0°, and bagged, and then an autoclave was used for primary curing under the curing conditions shown in Table 6 (pressure: 0.5 MPa, vacuum pressure: 0.1 MPa, temperature-elevating rate: 1.7° C./min), to obtain a composite panel with 1000 mm length× 800 mm width. The sides of the obtained composite panel were each trimmed to 10 mm, and then when necessary, an oven was used for secondary curing under the curing conditions shown in Table 6 (temperature-elevating rate: 1.7° C./min), and the thickness of each panel was measured at 24 points on the outer periphery section and 27 points on the inner wall section. The outer periphery section was defined as an arbitrary location on the inner side 20-25 mm from each side, and the inner wall section was defined as an arbitrary location on the inner side at least another 50 mm from the outer periphery section, and measurement was conducted at dispersed locations to avoid bias of the measuring locations.

Examples 1-12

Figure 2:
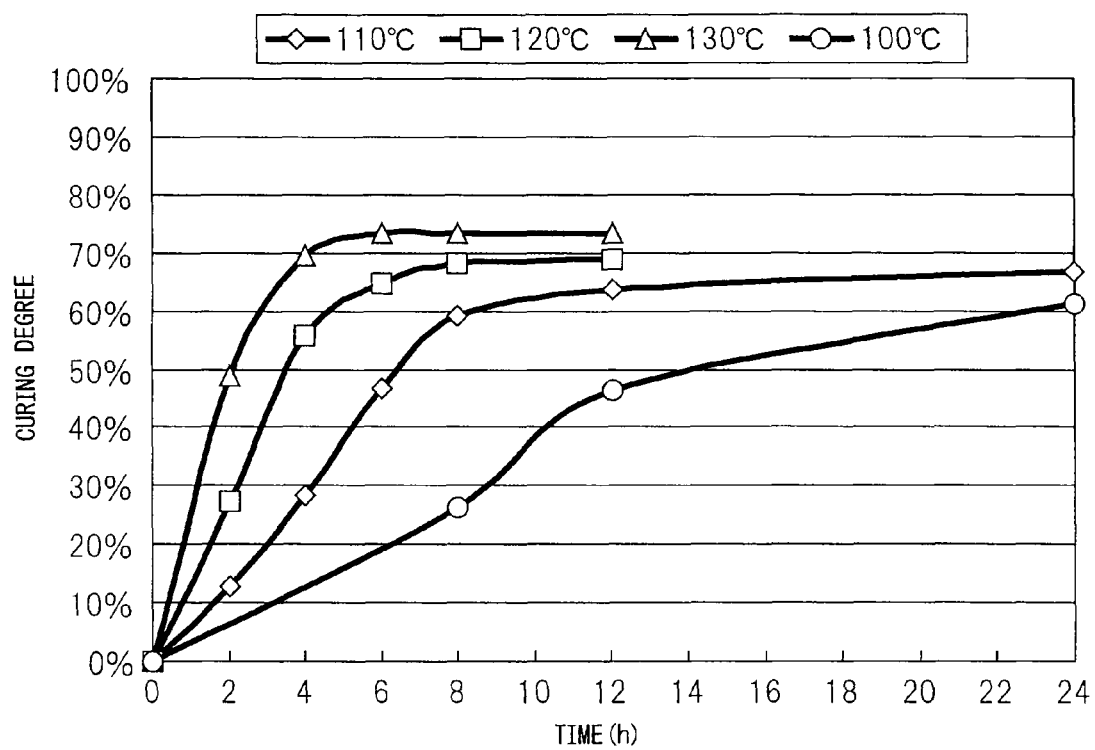
FIG. 2 is a graph showing primary curing degrees with different temperatures and times.

The resin compositions of Examples 1 to 12 were cured by moderate temperature primary curing (120° C. for 8 hours) and high-temperature secondary curing (200° C. for 2 hours) to obtain cured resins with both high mechanical strength (resin bending properties) and high heat resistance (DMA-Tg) (Table 1, Table 2, Table 3). Upon measuring the curing degree at different temperatures in Example 2, the curing degree exceeded 50% with 6 hours at 110° C., 3 hours at 120° C. and 2 hours at 130° C., whereas the curing degree did not exceed 50% at 100° C., even with heating for 12 hours (FIG. 2, Table 7). In Example 7, a composite was obtained having both high mechanical strength (12K cloth composite bending properties) and high heat resistance (12K cloth composite DMA-Tg) (Table 4). Also in Example 7, a satisfactory molded article was obtained with low resin flow and few resin excess areas (Table 5). In addition, the molded sheet obtained in Example 7 had a small thickness difference between the outer periphery and inner sections (Table 6).

Comparative Example 1

In Comparative Example 1 which did not use jER604 as the epoxy resin (B), the G'-Tg of the cured resin of the obtained resin composition was reduced (Table 1).

Comparative Example 2

In Comparative Example 2 which did not use Tx742 as the epoxy resin (A), the elastic modulus of the obtained resin composition was increased and the heat resistance was reduced (Table 1).

Comparative Example 3

The resin jER604 as the epoxy resin (B) was changed to jER828 as another epoxy resin (F). The cured resin of the obtained resin composition exhibited excellent flexural elongation at break, but the heat resistance was significantly reduced (Table 1).

Comparative Example 4

The resin jER604 as the epoxy resin (B) was changed to HP-4032 as another epoxy resin (F), which has a rigid backbone and was predicted to function advantageously for both the mechanical properties and heat resistance. The cured resin of the obtained resin composition exhibited excellent flexural elongation at break, but the heat resistance was significantly reduced (Table 1).

Comparative Example 5

Upon comparing Example 2 in which moderate temperature primary curing (120° C. for 8 hours) and high-temperature secondary curing (200° C. for 2 hours) were carried out, and Comparative Example 5 in which only high-temperature curing (200° C. for 2 hours) was carried out, as a prior art method, for a resin with the same composition, Comparative Example 5 exhibited about the same resin bending properties and heat resistance as Example 2, but the molded sheet quality was slightly inferior to that of Example 2 (Table 2).

Comparative Example 6

Upon comparing Example 7 in which moderate temperature primary curing (120° C. for 8 hours) and high-temperature secondary curing (200° C. for 2 hours) were carried out, using a resin with the same composition, and Comparative Example 6 in which only low-temperature primary curing (120° C. for 8 hours) was carried out, the resin bending properties and heat resistance of the resin of Comparative Example 6 were inferior to those obtained in Example 7 (Table 3). Also, the 12K cloth composite bending properties and 12K cloth composite heat resistance in Comparative Example 6 were inferior to those obtained in Example 7 (Table 4).

Comparative Example 7

Upon comparing Example 7 in which moderate temperature primary curing (120° C. for 8 hours) and high-temperature secondary curing (200° C. for 2 hours) were carried out, and Comparative Example 7 in which only high-temperature curing (180° C. for 2 hours) was carried out, for a resin with the same composition, Comparative Example 7 exhibited about the same resin bending properties and heat resistance as Example 7 (Table 3). However, the 12K cloth composite bending properties and 12K cloth composite heat resistance in Comparative Example 7 were slightly inferior to those obtained in Example 7 (Table 4). Also, the difference in thickness between the outer periphery and inner sections of the molded sheet in Comparative Example 7 was greater than in Example 7 (Table 6).

Comparative Example 8

In Comparative Example 8, in which the same procedure was repeated as in Example 7 except for carrying out primary curing at 140° C. for 6 hours, the resin flow was reduced compared to Comparative Example 7 in which only high-temperature curing was carried out, and compared to Comparative Example 9 described hereunder, but it was increased compared to Example 7 (Table 5).

Comparative Example 9

In Comparative Example 9, in which the same procedure was repeated as in Example 7 except for carrying out high-temperature curing for both the primary curing and secondary curing (primary curing at 160° C. for 4 hours and secondary curing at 180° C. for 2 hours), the resin flow was increased and more resin excess sections were observed (Table 5).

Comparative Example 10

The diaminodiphenylsulfone (C) was changed to DCMU as a curing accelerator (G) and DICY as another curing agent (H). The cured resin from the resin composition obtained by low-temperature primary curing (100° C. for 4 hours) and high-temperature secondary curing (200° C. for 2 hours) had an increased elastic modulus and lower elongation, as well as reduced heat resistance (Table 8).

Comparative Example 11

The cured resin from the resin composition obtained by moderate-temperature primary curing (120° C. for 8 hours) and high-temperature secondary curing (200° C. for 2 hours) of a resin with the same composition as Comparative Example 5, had an increased elastic modulus and lower elongation, as well as reduced heat resistance (Table 8).

TABLE 1

| | | | Example 1 | Example 2 | Example 3 | Example 8 | Example 4 | Example 9 | Example 5 | Example 10 |
|---|---|---|---|---|---|---|---|---|---|---|
| Composition | A | Tx742 | 40 | 40 | 40 | 90 | 80 | 70 | 60 | 50 |
| | B | jER604 | 60 | 60 | 60 | 10 | 20 | 30 | 40 | 50 |
| | C | DDS | 37.2 | 46.5 | 55.8 | 40.0 | 41.3 | 42.6 | 42.9 | 45.2 |
| | F | jER828 | — | — | — | — | — | — | — | — |
| | | HP-4032 | — | — | — | — | — | — | — | — |
| Active hydrogen equivalents of DDS (C) | | | 0.8 | 1.0 | 1.2 | 1.0 | 1.0 | 1.0 | 1.0 | 1.0 |

TABLE 1-continued

| | | | | | | | |
|---|---|---|---|---|---|---|---|
| Flexural strength of secondary curing product (MPa) | 158 | 171 | 171 | 168 | 153 | 166 | 151 | 160 |
| Flexural modulus of secondary curing product (GPa) | 3.4 | 3.4 | 3.4 | 3.3 | 3.2 | 3.4 | 3.3 | 3.2 |
| Flexural elongation at break, for secondary curing product (%) | 6.4 | 7.3 | 7.4 | 8.4 | 6.3 | 7.4 | 6 | 7.1 |
| Glass transition temp. of secondary curing product (° C.) DMA G'-Tg | 269 | 266 | 259 | 315 | 301 | 287 | 278 | 268 |
| Glass transition temp. of secondary curing product (° C.) DMA tanδmax | 286 | 281 | 273 | 328 | 316 | 303 | 293 | 285 |
| Primary curing degree (%) | 59 | 67 | 72 | 77 | 73 | 70 | 69 | 68 |

| | | | Example 11 | Example 6 | Example 12 | Comp. Ex. 1 | Comp. Ex. 2 | Comp. Ex. 3 | Comp. Ex. 4 |
|---|---|---|---|---|---|---|---|---|---|
| Composition | A | Tx742 | 30 | 20 | 10 | 100 | — | 40 | 40 |
| | B | jER604 | 70 | 80 | 90 | — | 100 | — | — |
| | C | DDS | 47.7 | 49.1 | 50.4 | 38.6 | 51.7 | 35.2 | 40.1 |
| | F | jER828 | — | — | — | — | — | 60 | — |
| | | HP-4032 | — | — | — | — | — | — | 60 |
| Active hydrogen equivalents of DDS (C) | | | 1.0 | 1.0 | 1.0 | 1.0 | 1.0 | 1.0 | 1.0 |
| Flexural strength of secondary curing product (MPa) | | | 166 | 172 | 162 | 155 | 172 | 152 | 181 |
| Flexural modulus of secondary curing product (GPa) | | | 3.4 | 3.6 | 3.6 | 3.2 | 3.7 | 3.0 | 3.5 |
| Flexural elongation at break, for secondary curing product (%) | | | 7.1 | 7 | 6.9 | 8.8 | 7.3 | 9.6 | 8.2 |
| Glass transition temp. of secondary curing product (° C.) DMA G'-Tg | | | 258 | 257 | 253 | 234 | 251 | 223 | 222 |
| Glass transition temp. of secondary curing product (° C.) DMA tanδmax | | | 274 | 271 | 268 | 337 | 266 | 238 | 241 |
| Primary curing degree (%) | | | 70 | 66 | 65 | 78 | 65 | 84 | 77 |

All curing conditions:
Primary curing (120° C. × 8 hrs),
secondary curing: (200° C. × 2 hrs)

TABLE 2

| | | | Example 2 | Comp. Ex. 5 |
|---|---|---|---|---|
| Composition | A | Tx742 | 40 | 40 |
| | B | jER604 | 60 | 60 |
| | C | DDS | 46.5 | 46.5 |
| Primary curing conditions | | Temp. (° C.) | 120 | 200 |
| | | Time (h) | 8 | 2 |
| Secondary curing conditions | | Temp. (° C.) | 200 | — |
| | | Time (h) | 2 | — |
| Active hydrogen equivalents of DDS (C) | | | 1.0 | 1.0 |
| Flexural strength of secondary curing product (MPa) | | | 171 | 157 |
| Flexural modulus of secondary curing product (GPa) | | | 3.36 | 3.41 |
| Flexural elongation at break, for secondary curing product (%) | | | 7.3 | 7 |
| Glass transition temp. of secondary curing product (° C.) DMA G'-Tg | | | 266 | 263 |
| Glass transition temp. of secondary curing product (° C.) DMA tanδmax | | | 281 | 278 |

TABLE 3

| | | | Example 7 | Comp. Ex. 6 | Comp. Ex. 7 |
|---|---|---|---|---|---|
| Composition | A | Tx742 | 40 | 40 | 40 |
| | B | jER604 | 60 | 60 | 60 |
| | C | DDS | 48.4 | 48.4 | 48.4 |
| | D | A380 | 5.75 | 5.75 | 5.75 |
| | E | YP50S | 5 | 5 | 5 |
| | F | jER828 | 10 | 10 | 10 |
| Primary curing conditions | | Temp. (° C.) | 120 | 120 | 180 |
| | | Time (h) | 8 | 8 | 2 |
| Secondary curing conditions | | Temp. (° C.) | 200 | — | — |
| | | Time (h) | 2 | — | — |
| Active hydrogen equivalents of DDS (C) | | | 1.0 | 1.0 | 1.0 |
| Flexural strength of secondary curing product (MPa) | | | 170 | 151 | 170 |
| Flexural modulus of secondary curing product (GPa) | | | 3.5 | 3.8 | 3.4 |
| Flexural elongation at break, for secondary curing product (%) | | | 8 | 4.6 | 6.8 |
| Glass transition temp. of secondary curing product (° C.) DMA G'-Tg | | | 250 | 130 | 206 |
| Glass transition temp. of secondary curing product (° C.) DMA tanδmax | | | 270 | 153 | 229 |

TABLE 4

|  |  |  | Example 7 | Comp. Ex. 6 | Comp. Ex. 7 |
|---|---|---|---|---|---|
| Composition | A | Tx742 | 40 | 40 | 40 |
|  | B | jER604 | 60 | 60 | 60 |
|  | C | DDS | 48.4 | 48.4 | 48.4 |
|  | D | A380 | 5.75 | 5.75 | 5.75 |
|  | E | YP50S | 5 | 5 | 5 |
|  | F | jER828 | 10 | 10 | 10 |
| Primary curing conditions | Temp. (°C.) |  | 120 | 120 | 180 |
|  | Time (h) |  | 8 | 8 | 2 |
| Secondary curing conditions | Temp. (°C.) |  | 200 | — | — |
|  | Time (h) |  | 2 | — | — |
| Active hydrogen equivalents of DDS (C) |  |  | 1.0 | 1.0 | 1.0 |
| Flexural strength of 12K cloth composite (MPa) |  |  | 825 | 623 | 667 |
| Flexural modulus of 12K cloth composite (GPa) |  |  | 54.6 | 53.1 | 54 |
| Glass transition temp. of 12K cloth composite (°C.) DMA G'-Tg |  |  | 225 | 137 | 206 |
| Glass transition temp. of 12K cloth composite (°C.) DMA tanδmax |  |  | 252 | 166 | 249 |
| Vf of 12K cloth composite |  |  | 52.6 | 52.6 | 53.2 |

TABLE 5

|  |  | Example 7 | Comp. Ex. 8 | Comp. Ex. 9 |
|---|---|---|---|---|
| Primary curing conditions | Temp. | 120° C. | 140° C. | 160° C. |
|  | Time | 8 hr | 6 hr | 4 hr |
| Resin flow[a] |  | 1 | 2 | 3 |
| Resin-rich sections[b] |  | 1 | 2 | 3 |
| Restrictions on die/secondary materials[c] |  | 1 | 2 | 3 |
| Secondary curing conditions | Temp. | 200° C. | 200° C. | 180° C. |
|  | Time | 2 hr | 2 hr | 2 hr |
| Warping in secondary curing |  | None | None | None |

[a] Few 1 ↔ 3 Numerous
[b] Few 1 ↔ 3 Numerous
[c] Low 1 ↔ 3 High

TABLE 6

|  |  |  |  | Example 7 | Comp. Ex. 7 |
|---|---|---|---|---|---|
| Composition | A |  | Tx742 | 40 | 40 |
|  | B |  | jER604 | 60 | 60 |
|  | C |  | DDS | 48.4 | 48.4 |
|  | D |  | A380 | 5.75 | 5.75 |
|  | E |  | YP50S | 5 | 5 |
|  | F |  | jER828 | 10 | 10 |
| Primary curing conditions | Temp. (°C.) |  |  | 120 | 180 |
|  | Time (h) |  |  | 8 | 2 |
| Secondary curing conditions | Temp. (°C.) |  |  | 200 | — |
|  | Time (h) |  |  | 2 | — |
| Active hydrogen equivalents of DDS (C) |  |  |  | 1.0 | 1.0 |
| Thickness (mm) | Inner wall section | Mean |  | 3.967 | 3.953 |
|  |  | Max. |  | 4.000 | 4.010 |
|  |  | Min. |  | 3.915 | 3.905 |
|  | Outer periphery section | Mean |  | 3.938 | 3.867 |
|  |  | Max. |  | 3.985 | 3.918 |
|  |  | Min. |  | 3.867 | 3.798 |

TABLE 7

|  |  |  | Example 2 |
|---|---|---|---|
| Composition | A | Tx742 | 40 |
|  | B | jER604 | 60 |
|  | C | DDS | 46.5 |
|  | F | jER828 | — |
|  |  | HP-4032 | — |
| Active hydrogen equivalents of DDS (C) |  |  | 1.0 |

| Curing temperature | Curing time (h) | Primary curing degree |
|---|---|---|
| 100° C. | 8 | 26% |
|  | 12 | 46% |
|  | 24 | 61% |
| 110° C. | 2 | 13% |
|  | 4 | 28% |
|  | 6 | 47% |
|  | 8 | 59% |
|  | 12 | 64% |
|  | 24 | 67% |
| 120° C. | 2 | 27% |
|  | 4 | 56% |
|  | 6 | 65% |
|  | 8 | 68% |
|  | 12 | 69% |
| 130° C. | 2 | 49% |
|  | 4 | 69% |
|  | 6 | 73% |
|  | 8 | 73% |
|  | 12 | 74% |

TABLE 8

|  |  |  | Comp. Ex. 10 | Comp. Ex. 11 |
|---|---|---|---|---|
| Composition | A | Tx742 | 40 | 50 |
|  | B | jER604 | 60 | 60 |
|  | G | DCMU | 3 | 3 |
|  | H | DICY | 9.45 | 9.45 |
| Primary curing conditions | Temp. (°C.) |  | 100 | 120 |
|  | Time (h) |  | 4 | 8 |
| Secondary curing conditions | Temp. (°C.) |  | 200 | 200 |
|  | Time (h) |  | 2 | 2 |
| Flexural strength of secondary curing product (MPa) |  |  | 135 | 132 |
| Flexural modulus of secondary curing product (GPa) |  |  | 3.8 | 3.9 |
| Flexural elongation at break, for secondary curing product (%) |  |  | 4.0 | 3.7 |
| Glass transition temp. of secondary curing product (°C.) DMA G'-Tg |  |  | 218 | 216 |
| Glass transition temp. of secondary curing product (°C.) DMA tan δ max |  |  | 237 | 234 |
| Primary curing degree (%) |  |  | 60 | 73 |

INDUSTRIAL APPLICABILITY

According to the invention it is possible to provide a fiber-reinforced composite material with excellent mechanical strength, heat resistance, moldability and outer appearance. This minimizes restrictions on the mold material and subsidiary materials, and allows a wide variety of molding operations to be performed. The invention is therefore very useful for industry.

The invention claimed is:

1. A method for producing a fiber-reinforced composite material, the method comprising:
   (I) impregnating a fiber substrate comprising reinforcing fibers with an epoxy resin composition, to obtain a fiber-reinforced prepreg;
   (II) curing the fiber-reinforced prepreg at a primary curing temperature in a range from 110-130° C., to obtain a primary fiber-reinforced composite material; and then
   (III) curing the primary fiber-reinforced composite material at a secondary curing temperature, which is at least as high as the primary curing temperature, to obtain the fiber-reinforced composite material, wherein the epoxy resin composition comprises:
(A) a triphenylmethane epoxy resin of formula 1:

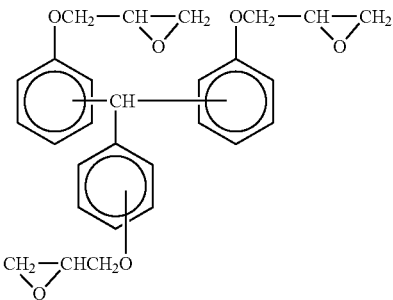

(B) an N,N,N',N'-tetraglycidyldiaminodiphenylmethane;
(C) a diaminodiphenylsulfone in an amount such that a ratio of amine equivalents to epoxy equivalents in the epoxy resin composition is from 0.8 to 1.2; and
(D) silica in an amount of 1 to 20 parts by mass with respect to 100 parts by mass of the sum of the triphenylmethane epoxy resin of formula 1 and the N,N,N',N'-tetraglycidyldiaminodiphenylmethane.

2. The method of claim 1, wherein the secondary curing temperature is 180° C. or higher.

3. The method of claim 2, wherein the secondary curing temperature is no higher than 300° C.

4. The method of claim 1, wherein the fiber substrate comprises carbon fibers.

5. The method of claim 1, wherein the fiber substrate is a woven fabric.

6. The method of claim 1, wherein the fiber substrate comprises a chopped material.

7. The method of claim 1, wherein the curing (II) is carried out in a mother die, and
the method further comprises, after the curing (II), removing the primary fiber-reinforced composite material from the mother die,
wherein the curing (III) is carried out in a free standing state, thereby obtaining the fiber-reinforced composited material in the form of a heat-resistant mold material.

8. The method of claim 1, wherein the curing (II) is carried out in a mother die, and
the method further comprises, after the curing (II), removing the primary fiber-reinforced composite material from the mother die,
wherein the curing (III) is carried out in a free standing state, thereby obtaining the fiber-reinforced composited material in the form of a heat-resistant structural material.

9. The method of claim 1, wherein a mass ratio of (A) and (B) in the epoxy resin composition is in a range from 90:10 to 10:90.

10. The method of claim 1, wherein a mass ratio of (A) and (B) in the epoxy resin composition is in a range from 90:10 to 30:70.

11. The method of claim 1, wherein a mass ratio of (A) and (B) in the epoxy resin composition is in a range from 80:20 to 10:90.

12. The method of claim 1, wherein the diaminodiphenylsulfone (C) is a 4,4'-diaminodiphenylsulfone or a 3,3'-diaminodiphenylsulfone.

13. The method of claim 1, wherein the primary curing temperature is in a range from 110-120° C.

14. The method of claim 1, wherein the secondary curing temperature is 200° C. or higher.

15. The method of claim 14, wherein the secondary curing temperature is no higher than 300° C.

16. The method of claim 1, wherein the secondary curing temperature is no higher than 300° C.

17. The method of claim 1, wherein the fiber substrate comprises glass fibers.

18. The method of claim 1, wherein the fiber substrate consists of carbon fibers.

19. The method of claim 1, wherein (A) and (B) in the epoxy resin are in a mass ratio of 90:10 to 40:60.

* * * * *